United States Patent
Heiliger

(10) Patent No.: US 12,491,045 B2
(45) Date of Patent: Dec. 9, 2025

(54) HYBRID BALL JOINT FOR ARTICULATION SHAFT OF A SURGICAL INSTRUMENT

(71) Applicant: Covidien LP, Mansfield, MA (US)

(72) Inventor: Zachary S. Heiliger, Nederland, CO (US)

(73) Assignee: Covidien LP, Mansfield, MA (US)

( * ) Notice: Subject to any disclaimer, the term of this patent is extended or adjusted under 35 U.S.C. 154(b) by 622 days.

(21) Appl. No.: 17/945,503

(22) Filed: Sep. 15, 2022

(65) Prior Publication Data

US 2023/0136246 A1    May 4, 2023

Related U.S. Application Data

(60) Provisional application No. 63/274,068, filed on Nov. 1, 2021.

(51) Int. Cl.
*A61B 90/50* (2016.01)
*F16C 11/06* (2006.01)

(52) U.S. Cl.
CPC .............. *A61B 90/50* (2016.02); *F16C 11/06* (2013.01)

(58) Field of Classification Search
CPC ... F16C 11/06; F16C 11/0604; F16C 11/0614; F16C 11/0685; F16C 2316/10;
(Continued)

(56) References Cited

U.S. PATENT DOCUMENTS

| 5,752,973 A | 5/1998 | Kieturakis |
| 5,792,135 A | 8/1998 | Madhani et al. |

(Continued)

FOREIGN PATENT DOCUMENTS

| EP | 2783653 A1 | 10/2014 |
| WO | 2011011473 A1 | 1/2011 |

(Continued)

OTHER PUBLICATIONS

Extended European Search Report issued in corresponding European Application No. 20154024.2 dated Jun. 26, 2020, 9 pages.

(Continued)

*Primary Examiner* — Scott Luan

(57) ABSTRACT

An articulating surgical instrument includes a housing having a shaft extending therefrom, the shaft having a proximal segment and a distal segment separated by an articulation section configured to articulate the distal segment relative to the proximal segment upon actuation thereof. The articulating section includes: a ball joint having a plurality of opposing spherical segments, each adjacent pair of spherical segments defining a channel therebetween configured to receive an articulation cable therethrough, each channel including an angled surface on opposing sides thereof to allow articulation of each cable along a respective length thereof; and a pair of casings configured to operably receive and retain the ball joint on opposing ends thereof, each casing including a chamfer defined therein configured to rotationally receive an end of the ball joint therein, each casing including a corresponding number of apertures defined therein each configured to receive a respective articulation cable therethrough.

20 Claims, 7 Drawing Sheets

(58) Field of Classification Search
CPC ............... A61B 17/29; A61B 18/1445; A61B 2017/00327; A61B 2017/2947; A61B 2018/1455; A61B 34/71; A61B 90/50
See application file for complete search history.

(56) References Cited

U.S. PATENT DOCUMENTS

| | | | |
|---|---|---|---|
| 5,848,986 | A | 12/1998 | Lundquist et al. |
| 6,817,974 | B2 | 11/2004 | Cooper et al. |
| 7,799,028 | B2 | 9/2010 | Schechter et al. |
| 7,861,906 | B2 | 1/2011 | Doll et al. |
| 7,918,230 | B2 | 4/2011 | Whitman et al. |
| 8,579,176 | B2 | 11/2013 | Smith et al. |
| 9,055,961 | B2 | 6/2015 | Manzo et al. |
| 9,474,569 | B2 | 10/2016 | Manzo et al. |
| 2002/0099371 | A1 | 7/2002 | Schulze et al. |
| 2002/0177842 | A1 | 11/2002 | Weiss |
| 2003/0125734 | A1 | 7/2003 | Mollenauer |
| 2003/0208186 | A1 | 11/2003 | Moreyra |
| 2006/0022015 | A1 | 2/2006 | Shelton et al. |
| 2006/0025811 | A1 | 2/2006 | Shelton |
| 2006/0161138 | A1 | 7/2006 | Orban et al. |
| 2007/0233052 | A1 | 10/2007 | Brock |
| 2008/0015631 | A1 | 1/2008 | Lee et al. |
| 2010/0274265 | A1 | 10/2010 | Wingardner et al. |
| 2010/0292691 | A1 | 11/2010 | Brogna |
| 2011/0118707 | A1 | 5/2011 | Burbank |
| 2011/0118708 | A1 | 5/2011 | Burbank et al. |
| 2011/0118709 | A1 | 5/2011 | Burbank |
| 2011/0118754 | A1 | 5/2011 | Dachs, II et al. |
| 2012/0150351 | A1* | 6/2012 | Bosscher ............... G05G 9/047 700/264 |
| 2014/0276723 | A1 | 9/2014 | Parihar et al. |
| 2016/0290387 | A1* | 10/2016 | Richman ............. F16C 11/0685 |
| 2017/0042560 | A1 | 2/2017 | Lee et al. |
| 2017/0269460 | A1* | 9/2017 | Fagerkvist ............. F16M 11/14 |
| 2019/0368538 | A1* | 12/2019 | Frangioni ............. F16C 41/001 |
| 2022/0039895 | A1 | 2/2022 | Adams et al. |

FOREIGN PATENT DOCUMENTS

| | | |
|---|---|---|
| WO | 2013166409 A1 | 11/2013 |
| WO | 2017136710 A2 | 8/2017 |
| WO | 2021041454 A1 | 3/2021 |

OTHER PUBLICATIONS

Extended European Search Report issued in corresponding European Application No. 20157439.9 dated Jun. 25, 2020, 9 pages.
Extended European Search Report 22204865.4 dated Mar. 9, 2023.

* cited by examiner

HYBRID BALL JOINT FOR ARTICULATION SHAFT OF A SURGICAL INSTRUMENT

CROSS REFERENCE TO RELATED APPLICATION

This application claims the benefit of U.S. Provisional Application Ser. No. 63/274,068 filed Nov. 1, 2021, the entire contents of which being incorporated by reference herein.

FIELD

The present disclosure relates to surgical instruments and, more specifically, to linkages and joints associated with articulatable surgical instruments for use in robotic surgical systems.

BACKGROUND

Robotic surgical systems are increasingly utilized in various different surgical procedures. Some robotic surgical systems include a console supporting a robotic arm. One or more different surgical instruments may be configured for use with the robotic surgical system and selectively mountable to the robotic arm. The robotic arm provides one or more inputs to the mounted surgical instrument to enable operation of the mounted surgical instrument.

A surgical forceps, one type of instrument capable of being utilized with a robotic surgical system, relies on mechanical action between its jaw members to grasp, clamp, and constrict tissue. Electrosurgical forceps utilize both mechanical clamping action and energy to heat tissue to treat, e.g., coagulate, cauterize, or seal, tissue. In many instances, the end effector of the forceps must be articulated via articulation cables to properly oriented the jaw members for treating tissue. Guiding these cables and the various internal components (e.g., cutting element, drive cable, electrical connections, etc.) through the shaft can be a challenge for manufacturers.

SUMMARY

As used herein, the term "distal" refers to the portion that is being described which is farther from an operator (whether a human surgeon or a surgical robot), while the term "proximal" refers to the portion that is being described which is closer to the operator. The terms "about," "substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Provided in accordance with aspects of the present disclosure is an articulating surgical instrument which includes a housing having a shaft extending therefrom, the shaft having a proximal segment and a distal segment separated by an articulation section configured to articulate the distal segment relative to the proximal segment upon actuation thereof. The articulating section includes a ball joint having a plurality of opposing spherical segments, each adjacent pair of spherical segments defining a channel therebetween configured to receive an articulation cable therethrough, each channel including an angled surface on opposing sides thereof to allow articulation of each cable along a respective length thereof. The articulating section also includes a pair of casings configured to operably receive and retain the ball joint on opposing ends thereof, each casing including a chamfer defined therein configured to rotationally receive an end of the ball joint therein, each casing including a corresponding number of apertures defined therein each configured to receive a respective articulation cable therethrough.

In aspects according to the present disclosure, each angled surface of each channel allows the respective articulation cable to articulate from about zero degrees to about sixty degrees.

In aspects according to the present disclosure, the ball joint includes a central aperture defined therethrough configured to centrally guide one or more actuation or electrical components therethrough without being affected by articulation of the distal segment. In other aspects according to the present disclosure, the one or more actuation or electrical components include a drive rod, cutter rod and electrical lead wires.

In aspects according to the present disclosure, the opposing casings are configured to abut one another when the distal segment reaches full articulation.

In aspects according to the present disclosure, the ball joint is configured to receive four articulation cables arranged in opposing pairs. In other aspects according to the present disclosure, the opposing pairs of articulation cables, when taught, resist rotation of the ball joint relative to the shaft.

Provided in accordance with aspects of the present disclosure is an articulating section for a shaft of a surgical instrument that includes a ball joint having a plurality of opposing spherical segments, each adjacent pair of spherical segments defining a channel therebetween configured to receive an articulation cable therethrough. Each channel includes an angled surface on opposing sides thereof to allow articulation of each cable along a respective length thereof. The articulating section also includes a pair of casings configured to operably receive and retain the ball joint on opposing ends thereto. Each casing includes a chamfer defined therein configured to rotationally receive an end of the ball joint therein and a corresponding number of apertures defined therein each configured to receive a respective articulation cable therethrough.

In aspects according to the present disclosure, each angled surface of each channel allows the respective articulation cable to articulate from about zero degrees to about sixty degrees.

In aspects according to the present disclosure, the ball joint includes a central aperture defined therethrough configured to centrally guide one or more actuation or electrical components therethrough without being affected by articulation of the articulating section. In other aspects according to the present disclosure, the one or more actuation or electrical components include a drive rod, cutter rod and electrical lead wires.

In aspects according to the present disclosure, the opposing casings are configured to abut one another when the articulating section reaches full articulation.

In aspects according to the present disclosure, the ball joint is configured to receive four articulation cables arranged in opposing pairs. In other aspects according to the present disclosure, the opposing pairs of articulation cables, when taught, resist rotation of the ball joint relative to a shaft of the surgical instrument.

BRIEF DESCRIPTION OF THE DRAWINGS

Various aspects and features of the present disclosure are described hereinbelow with reference to the drawings wherein.

DETAILED DESCRIPTION

Figure 1:
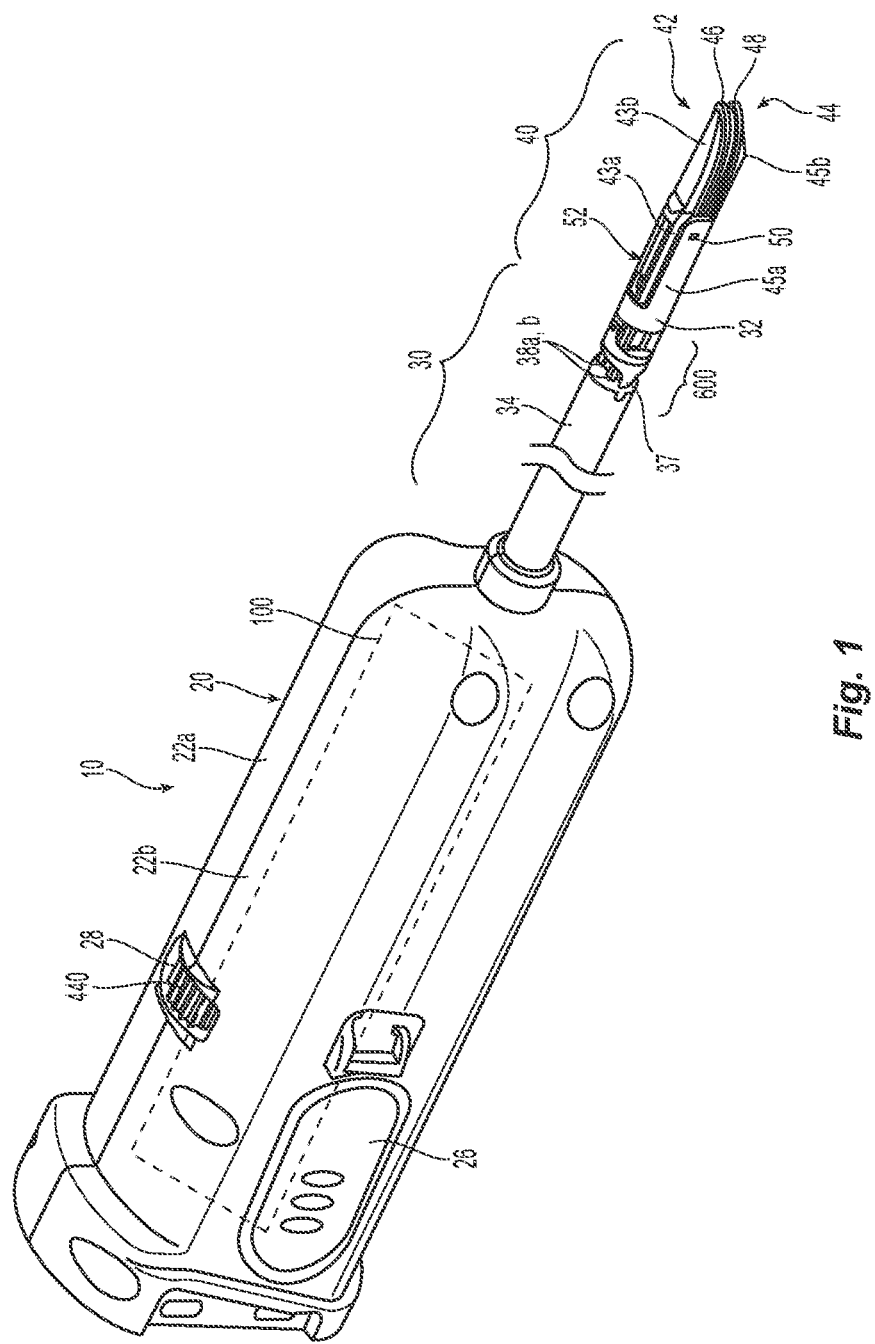
FIG. 1 is a perspective view of a surgical instrument in accordance with the present disclosure configured for mounting on a robotic arm of a robotic surgical system and including a shaft with an articulation section.
Figure 2:
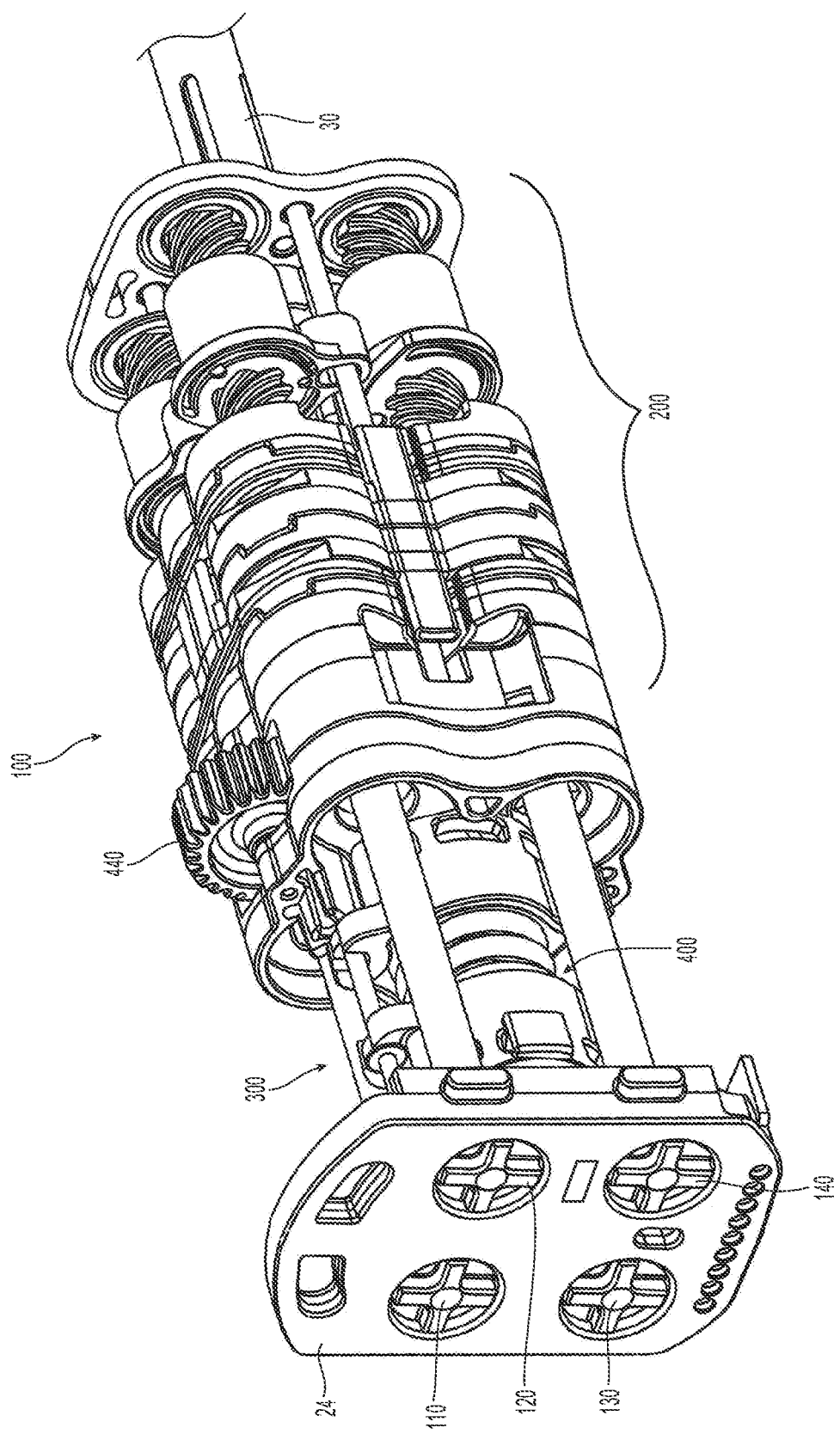
FIG. 2 is a rear perspective view of a proximal portion of the surgical instrument of FIG. 1 with an outer housing removed.
Figure 3:
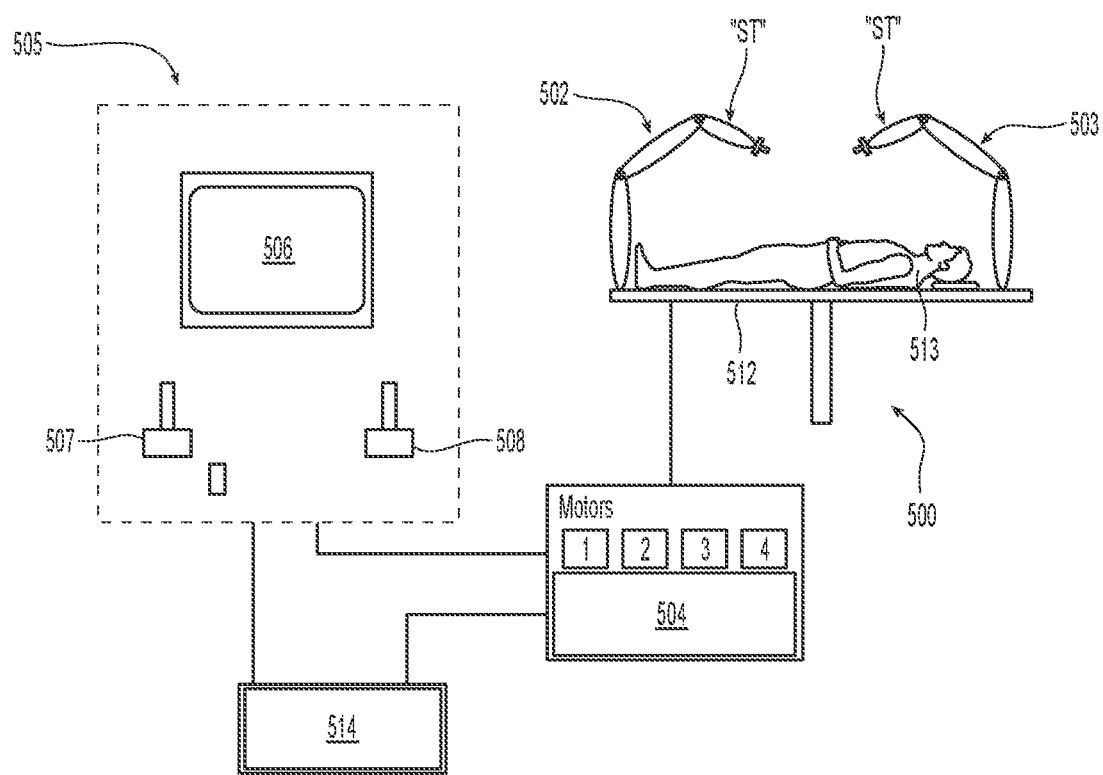
FIG. 3 is a schematic illustration of an exemplary robotic surgical system configured to releasably receive the surgical instrument of FIG. 1.

Referring to FIGS. 1 and 2, a surgical instrument 10 provided in accordance with the present disclosure generally includes a housing 20, a shaft 30 extending distally from housing 20, an end effector assembly 40 extending distally from shaft 30, and an actuation assembly 100 (shown in phantom in FIG. 1) disposed within housing 20 and operably associated with shaft 30 and end effector assembly 40. Instrument 10 is detailed herein as an articulating electrosurgical forceps configured for use with a robotic surgical system, e.g., robotic surgical system 500 (FIG. 3). However, the aspects and features of instrument 10 provided in accordance with the present disclosure, detailed below, are equally applicable for use with other suitable surgical instruments (including non-robotic surgical instrument) and/or in other suitable surgical systems (including non-robotic surgical systems).

Housing 20 of instrument 10 includes first and second body portion 22a, 22b and a proximal face plate 24 (FIG. 2) that cooperate to enclose actuation assembly 100 therein. Proximal face plate 24 includes apertures defined therein through which inputs 110-140 of actuation assembly 100 extend. A pair of latch levers 26 (only one of which is illustrated in FIG. 1) extend outwardly from opposing sides of housing 20 and enables releasable engagement (directly or indirectly) of housing 20 with a robotic arm of a surgical system, e.g., robotic surgical system 500 (FIG. 3). An aperture 28 defined through housing 20 permits thumbwheel 440 to extend therethrough to enable manual manipulation of thumbwheel 440 from the exterior of housing 20 to permit manual opening and closing of end effector assembly 40.

Shaft 30 of instrument 10 includes a distal segment 32, a proximal segment 34, and an articulating section 600 disposed between the distal and proximal segments 32, 34, respectively. Articulating section 600 includes one or more articulating components 610, e.g., links, joints, etc. A plurality of articulation cables 38a-38d, e.g., four (4) articulation cables, or other suitable actuators, extends through articulating section 600. More specifically, articulation cables 38a-38d are operably coupled to distal segment 32 of shaft 30 at the distal ends thereof and extend proximally from distal segment 32 of shaft 30, through articulating section 600 of shaft 30 and proximal segment 34 of shaft 30, and into housing 20, wherein articulation cables 38a-38d operably couple with an articulation assembly 200 of actuation assembly 100 to enable selective articulation of distal segment 32 (and, thus end effector assembly 40) relative to proximal segment 34 and housing 20, e.g., about at least two axes of articulation (yaw and pitch articulation, for example). Articulation cables 38a-38d are arranged in a generally rectangular configuration, although other suitable configurations are also contemplated.

With respect to articulation of end effector assembly 40 relative to proximal segment 34 of shaft 30, actuation of articulation cables 38a-38d is effected in pairs. More specifically, in order to pitch end effector assembly 40, the upper pair of cables 38a, 38d is actuated in a similar manner while the lower pair of cables 38b, 38c is actuated in a similar manner relative to one another but an opposite manner relative to the upper pair of cables 38a, 38b. With respect to yaw articulation, the right pair of cables 38a, 38b is actuated in a similar manner while the left pair of cables 38c, 38d is actuated in a similar manner relative to one another but an opposite manner relative to the right pair of cables 38a, 38b.

Distal segment 32 of shaft 30 defines a clevis portion of end effector assembly 40 that supports first and second jaw members 42, 44, respectively. Each jaw member 42, 44 includes a proximal extension portion 43a, 45a and a distal body portion 43b, 45b, respectively. Distal body portions 43b, 45b define opposed tissue-contacting surfaces 46, 48, respectively. Proximal extension portions 43a, 45a are pivotably coupled to one another about a pivot pin 50 and are operably coupled to one another via a cam drive mechanism 52 (described in greater detail below) to enable pivoting of jaw member 42 relative to jaw member 44 and distal segment 32 of shaft 30 between a spaced-apart position (e.g., an open position of end effector assembly 40) and an approximated position (e.g., a closed position of end effector assembly 40) for grasping tissue between tissue-contacting surfaces 46, 48. As an alternative to this unilateral configuration, a bilateral configuration may be provided whereby both jaw members 42, 44 are pivotable relative to one another and distal segment 32 of shaft 30.

A translating cutting element (not shown) is provided and selectively advanceable to enable cutting of tissue grasped between tissue-contacting surfaces 46, 48 of jaw members 42, 44, respectively. A cutting drive assembly 300 of actuation assembly 100 provides for selective actuation of a cutting rod 490 which, in turn, translates the cutting element to cut tissue grasped between tissue-contacting surfaces 46, 48. Cutting drive assembly 300 is operably coupled to third input 130 of actuation assembly 100 such that, upon receipt of appropriate rotational input into third input 130, cutting drive assembly 300 advances the cutting rod 490 to translate the cutting element between jaw members 42, 44 to cut tissue grasped between tissue-contacting surfaces 46, 48.

Continuing with reference to FIGS. 1 and 2, a drive rod 484 (FIG. 4) of cam drive mechanism 52 is operably coupled to end effector assembly 40 such that longitudinal actuation of drive rod 484 pivots jaw member 42 relative to jaw member 44 between the spaced-apart and approximated positions, as detailed below. More specifically, urging drive rod 484 proximally pivots jaw member 42 relative to jaw member 44 towards the approximated position while urging drive rod 484 distally pivots jaw member 42 relative to jaw member 44 towards the spaced-apart position. However, the reverse configuration is also contemplated. Drive rod 484 extends proximally from end effector assembly 40 through shaft 30 and into housing 20 wherein drive rod 484 is operably coupled with a jaw drive assembly 400 of actuation assembly 100 to enable selective actuation of end effector assembly 40 to grasp tissue therebetween and apply a closure force within an appropriate jaw closure force range, e.g., in response to an appropriate rotational input into fourth input 140.

Figure 4:
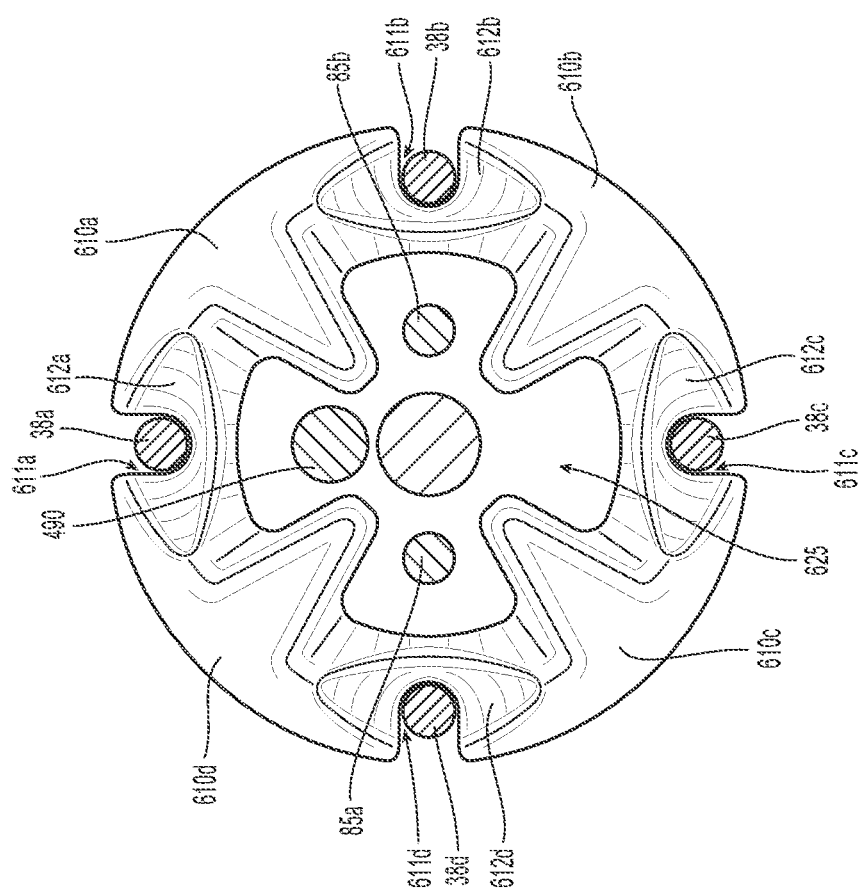
FIG. 4 is an enlarged, front view of a ball joint for use with the articulation section of FIG. 1.
Figure 5:
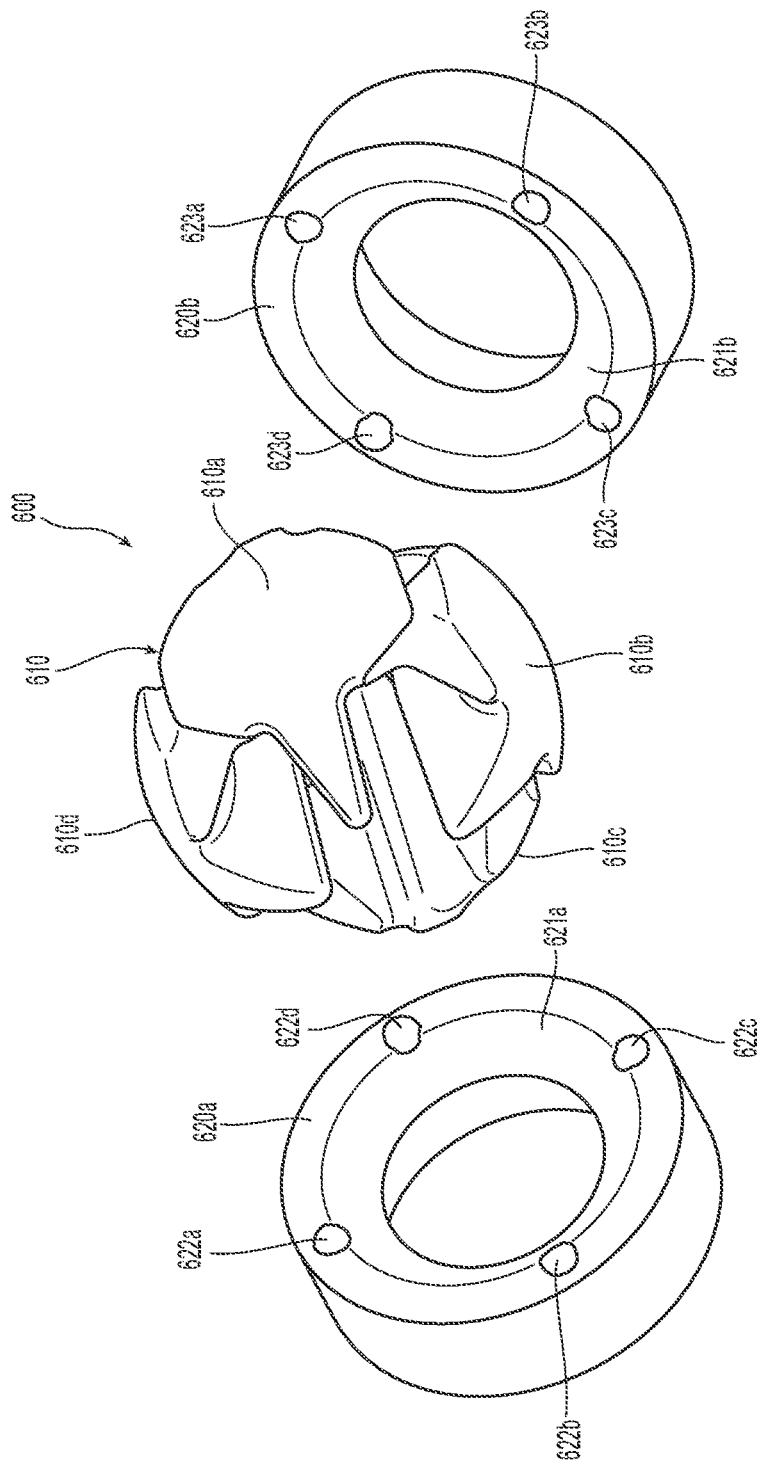
FIG. 5 is an enlarged, perspective view of the ball joint and surrounding casings for use with the articulation section of FIG. 1.

Tissue-contacting surfaces 46, 48 of jaw members 42, 44, respectively, are at least partially formed from an electrically conductive material and are energizable to different potentials to enable the conduction of electrical energy through tissue grasped therebetween, although tissue-contacting surfaces 46, 48 may alternatively be configured to supply any suitable energy, e.g., thermal, microwave, light, ultrasonic, etc., through tissue grasped therebetween for energy-based tissue treatment. Instrument 10 defines conductive pathways extending through housing 20 and shaft 30 to end effector assembly 40 that may include lead wires, contacts, and/or electrically-conductive components to enable electrical connection of tissue-contacting surfaces 46, 48 of jaw members 42, 44, respectively, to an energy source (not shown), e.g., an electrosurgical generator via an electrosurgical cable extending therebetween, for supplying energy to tissue-contacting surfaces 46, 48 to treat, e.g., seal, tissue grasped between tissue-contacting surfaces 46, 48. The electrically conductive pathways to tissue-contacting surfaces 46, 48 of jaw members 42, 44, are illustrated, for example, as respective first and second lead wires 85a, 85b (FIG. 4).

Actuation assembly 100 is disposed within housing 20 and includes articulation assembly 200, cutting drive assembly 300, and jaw drive assembly 400. Articulation assembly 200 is operably coupled between first and second inputs 110, 120, respectively, of actuation assembly 100 and articulation cables 38 such that, upon receipt of appropriate rotational inputs into first and/or second inputs 110, 120, articulation assembly 200 manipulates cables 38 (FIG. 1) to articulate end effector assembly 40 in a desired direction, e.g., to pitch and/or yaw end effector assembly 40. Cutting drive assembly 300, as noted above, enables reciprocation of the cutting element (not shown) between jaw members 42, 44 to cut tissue grasped between tissue-contacting surfaces 46, 48 in response to receipt of appropriate rotational input into third input 130. Jaw drive assembly 400 is operably coupled between fourth input 140 of actuation assembly 100 and drive rod 484 such that, upon receipt of appropriate rotational input into fourth input 140, jaw drive assembly 400 pivots jaw members 42, 44 between the spaced-apart and approximated positions to grasp tissue therebetween and apply a closure force within an appropriate closure force range.

Actuation assembly 100 is configured to operably interface with a robotic surgical system 500 (FIG. 3) when instrument 10 is mounted on robotic surgical system 500, to enable robotic operation of actuation assembly 100 to provide the above-detailed functionality. That is, robotic surgical system 500 selectively provides rotational inputs to inputs 110-140 of actuation assembly 100 to articulate end effector assembly 40, grasp tissue between jaw members 42, 44, and/or cut tissue grasped between jaw members 42, 44. However, it is also contemplated that actuation assembly 100 be configured to interface with any other suitable surgical system, e.g., a manual surgical handle, a powered surgical handle, etc. For the purposes herein, robotic surgical system 500 is generally described.

Robotic surgical system 500 is configured for use in accordance with the present disclosure. Aspects and features of robotic surgical system 500 not germane to the understanding of the present disclosure are omitted to avoid obscuring the aspects and features of the present disclosure in unnecessary detail.

Robotic surgical system 500 generally includes a plurality of robot arms 502, 503; a control device 504; and an operating console 505 coupled with control device 504. Operating console 505 may include a display device 506, which may be set up in particular to display three-dimensional images; and manual input devices 507, 508, by means of which a person, e.g., a surgeon, may be able to telemanipulate robot arms 502, 503 in a first operating mode. Robotic surgical system 500 may be configured for use on a patient 513 lying on a patient table 512 to be treated in a minimally invasive manner. Robotic surgical system 500 may further include a database 514, in particular coupled to control device 504, in which are stored, for example, preoperative data from patient 513 and/or anatomical atlases.

Each of the robot arms 502, 503 may include a plurality of members, which are connected through joints, and a mounted device which may be, for example, a surgical tool "ST." One or more of the surgical tools "ST" may be instrument 10 (FIG. 1), thus providing such functionality on a robotic surgical system 500.

Robot arms 502, 503 may be driven by electric drives, e.g., motors, connected to control device 504. Control device 504, e.g., a computer, may be configured to activate the motors, in particular by means of a computer program, in such a way that robot arms 502, 503, and, thus, their mounted surgical tools "ST" execute a desired movement and/or function according to a corresponding input from manual input devices 507, 508, respectively. Control device 504 may also be configured in such a way that it regulates the movement of robot arms 502, 503 and/or of the motors.

Figure 6A:
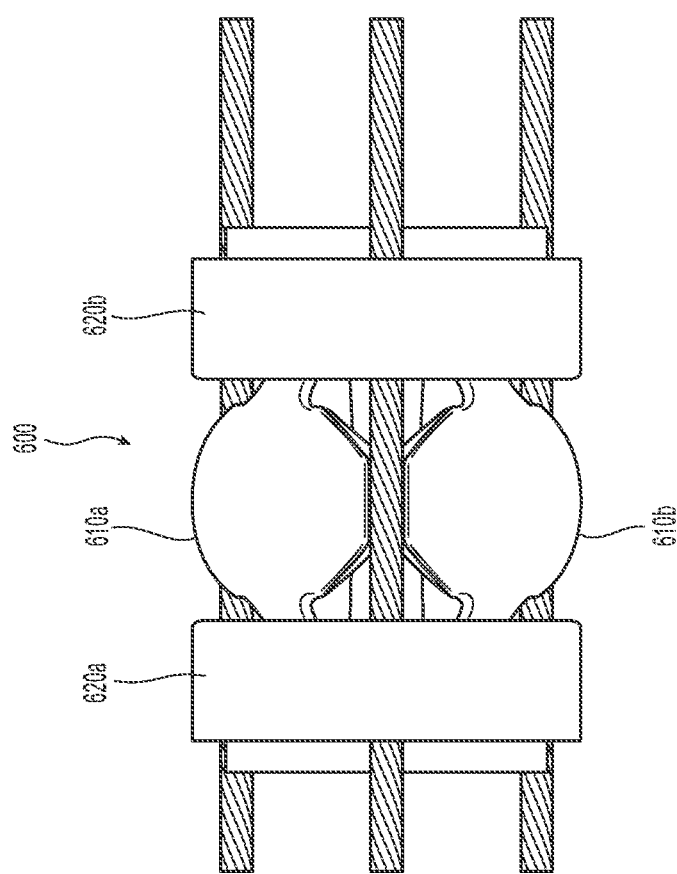
FIG. 6A is a side view of the articulation section and ball joint shown in a non-articulated configuration.
Figure 6B:
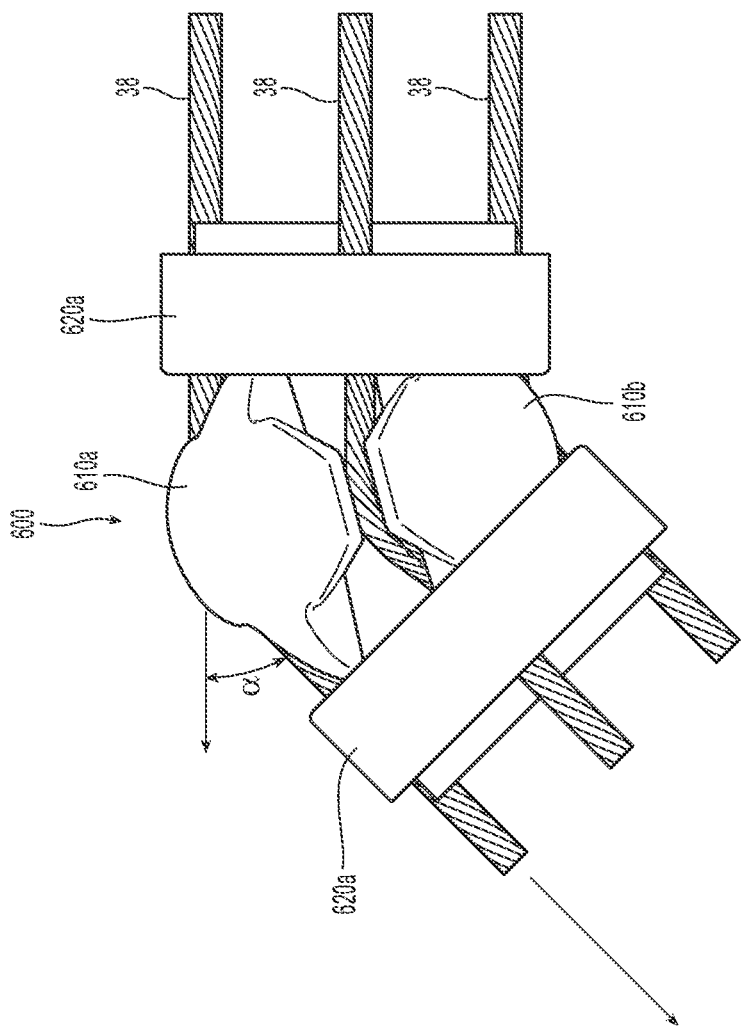
FIG. 6B is a side view of the articulation section and ball joint shown in an articulated configuration.

Turning now to FIGS. 4-6B, the articulation section 600 and the various components associated therewith are depicted in further detail. More particularly, articulation section 600 includes a ball joint 610 and a pair of opposing casings 620a and 620b that are configured to, upon assembly, encase ball joint 610 at least partially therein (FIG. 6A-6B). Ball joint 610 seats within opposing chamfers 621a, 621b defined in respective casings 620a, 620b such that the ball joint 610 is freely rotatable, e.g., articulatable, therein. Articulation cables, e.g., cables 38a-38d, feed through the ball joint 610 as described below.

Ball joint 610 includes one or more spherical segments 610a-610d which, together, make of the outer surface of the ball joint 610 and which are configured to rotationally seat within the respective interfaces or chamfers 621a, 621b defined in casings 620a, 620b. Although referred to herein as chamfers 621a, 621b, other interfaces are envisioned, e.g., spherical interfaces. Cable guide channels are defined between each respective pair of the segments, e.g., channel 611a defined between segments 610a, 610d, channel 611b defined between segments 610a, 610b, channel 611c a defined between segments 610b, 610c, and channel 611d defined between segments 610c, 610d. Each channel, e.g., 611a, is configured to receive a corresponding articulation cable, e.g., cable 38a, therein such that, as described in detail above, each opposing cable pair, e.g., cables 38a, 38c, may slide in opposite directions within its respective channel 611a, 611c to articulate the ball joint 610 and corresponding distal segment 32 of the shaft 30 in a given direction.

Each casing 620a, 620b, includes apertures defined therein configured to correspondingly receive respective cables therethrough, e.g., cable 38a is configured to feed through aperture 623a defined in casing 620b, then through channel 611a in ball joint 610, then through aperture 622a in casing 620a, cable 38b is configured to feed through aperture 623b defined in casing 620b, then through channel 611b in ball joint 610, then through aperture 622b in casing 620a, etc.

An angled surface is defined on each respective side of each channel in communication with the same, e.g., angled surface 612a is defined on each side of channel 611a, angled surface 612b is defined on each side of channel 611b, angled surface 612c is defined on each side of channel 611c, and angled surface 612d is defined on each side of channel 611d. Angled surfaces, e.g., angled surface 612a, are each configured to allow respective cables, e.g., cable 38a, to angle from a substantially straight or in-line orientation (FIG. 6A) to an angled orientation (FIG. 6B) to articulate (pitch and yaw) distal segment 32 at a desired angle α (FIG. 6B). Angled surfaces 612a-612d facilitate cable 38a-38d length changes and guide the cables 38a-38d through a smooth and gradual arc-like transition between casings 620a, 620b. Angle α may range from about zero degrees (0°) to about sixty degrees (60°) depending upon a particular purpose. Other ball joints 610 may be utilized that have greater articulation angles. Alternatively, multiple ball joints 610 may be utilized for higher angles in a compounding fashion As can be appreciated, designing the articulation section 600 with a single ball joint 610 capable of articulating sixty degrees (60°) in any direction simplifies the overall design and decreases overall surgical instrument expense. Moreover, a shaft 30 having a single ball joint 610 facilitates smoother articulation as the shaft 30 articulates about a single articulation plane. Casings 620a, 620b may be configured to contact one another at full articulation in any one direction along the articulation plane and, as such, act as a hard stop to the desire articulation angle, e.g., sixty degrees (60°). The casings 620a, 620b may be dimensioned to accommodate any maximum angle or hard stop.

As can be appreciated, when the cables 38a-38d are translated to articulate the distal segment 32 and held taught, the four (4) cables 38a-38d act as an anti-rotation feature and prevent unintended rotation of the distal segment 32 (and ball joint 610). This allows for more accurate and precise control of the distal segment 32 and, in turn, the end effector assembly 40.

Ball joint 610 also includes a central aperture 625 defined therethrough configured to route and guide the cutting rod 490, drive rod 484 and lead wires 85a, 85b centrally therethrough in such a manner so as not to be affected by articulation of the distal segment 32. The distal ends of the spherical segments 610a-610d may converge toward the central aperture 625 creating a cover-like appearance when viewed from the distal end. One or more portions of the clover-like central aperture 625 along with the distal ends of the spherical segments 610a-610d may be configured to guide or house one or more respective internal components therein.

It will be understood that various modifications may be made to the aspects and features disclosed herein. For example and as mentioned above, various electromechanical surgical instruments and/or electrosurgical instruments may be configured to be detachably couplable and controllable by a robotic surgical system. One exemplary robotic surgical system may generally include a plurality of surgical robotic arms each having an instrument drive unit with one or more electromechanical surgical instruments and/or electrosurgical instruments removably attached thereto; a control device; and an operating console coupled with the control device.

The operating console includes a display device, which is set up in particular to display three-dimensional images; and manual input devices by means of which a person, for example, a surgeon, is able to telemanipulate the robotic arms in a first operating mode, as known in principle to a person skilled in the art. Each of the robotic arms may be composed of a plurality of members, which are connected through joints. The robotic arms may be driven by electric drives that are connected to the control device. The control device (e.g., a computer) is set up to activate the drives, in particular by means of a computer program, in such a way that the robotic arms, the attached instrument drive units, and thus the various electromechanical surgical instruments and/or electrosurgical instruments execute a desired movement according to a movement defined by means of the manual input devices. The control device may also be set up in such a way that it regulates the movement of the robotic arms and/or of the drives.

The robotic surgical system is configured for use on a patient lying on a surgical table to be treated in a minimally invasive manner by means of the various electromechanical surgical instruments and/or electrosurgical instruments. The robotic surgical system may also include more than two robotic arms, the additional robotic arms likewise being connected to the control device and being telemanipulatable by means of the operating console. The various electromechanical surgical instruments and/or electrosurgical instruments may also be attached to the additional robotic arm.

The control device may control a plurality of motors, with each motor configured to drive movement of the robotic arms in a plurality of directions. Further, the control device may control the activation of the instrument drive unit to drive various operations of the various electromechanical surgical instruments and/or electrosurgical instruments, and may control a rotation of an internal motor pack of the instrument drive unit to ultimately rotate the various electromechanical surgical instruments and/or electrosurgical instruments about a longitudinal axis thereof.

The robotic surgical system may further include a surgical instrument holder configured to be coupled with or to the robotic arm. The surgical instrument holder holds the instrument drive unit and the various electromechanical surgical instruments and/or electrosurgical instruments. The surgical instrument holder supports or houses a motor, which receives controls and power from the control device to effect a rotation of an internal motor pack of the instrument drive unit, which results in a rotation of the various electromechanical surgical instruments and/or electrosurgical instruments about a longitudinal axis thereof. The surgical instrument holder may be slidably mounted onto a rail of the robotic arm and moved along the rail via a motor driven chain or belt or the like to adjust a position of the various electromechanical surgical instruments and/or electrosurgical instruments.

For a detailed description of the construction and operation of a robotic surgical system, reference may be made to U.S. Patent Application Publication No. 2012/0116416, filed on Nov. 3, 2011, entitled "Medical Workstation," the entire contents of which are incorporated by reference herein.

Therefore, the above description should not be construed as limiting, but merely as exemplifications of various aspects and features. Those skilled in the art will envision other modifications within the scope and spirit of the claims appended thereto.

What is claimed is:
1. An articulating surgical instrument, comprising:
   a housing having a shaft extending therefrom, the shaft including a proximal segment and a distal segment separated by an articulation section configured to articulate the distal segment relative to the proximal segment upon actuation thereof, the articulating section including:
   a ball joint including a plurality of opposing spherical segments, each adjacent pair of spherical segments defining a channel therebetween configured to receive an articulation cable therethrough, each channel including an angled surface on opposing sides thereof to allow articulation of each cable along a respective length thereof; and
   a pair of casings configured to operably receive and retain the ball joint on opposing ends thereof, each casing including a chamfer defined therein configured to rotationally receive an end of the ball joint therein, each casing including a corresponding number of apertures defined therein each configured to receive a respective articulation cable therethrough.

2. The articulating surgical instrument according to claim 1, wherein each angled surface of each channel allows the respective articulation cable to articulate from about zero degrees to about sixty degrees.

3. The articulating surgical instrument according to claim 1, wherein the ball joint includes a central aperture defined therethrough configured to centrally guide one or more actuation or electrical components therethrough without being affected by articulation of the distal segment.

4. The articulating surgical instrument according to claim 3, wherein the one or more actuation or electrical components include a drive rod, cutter rod and electrical lead wires.

5. The articulating surgical instrument according to claim 1, wherein the opposing casings are configured to abut one another when the distal segment reaches full articulation.

6. The articulating surgical instrument according to claim 1, wherein the ball joint is configured to receive four articulation cables arranged in opposing pairs.

7. The articulating surgical instrument according to claim 6, wherein the opposing pairs of articulation cables, when taut, resist rotation of the ball joint relative to the shaft.

8. An articulating section for a shaft of a surgical instrument, comprising:
   a ball joint including a plurality of opposing spherical segments, each adjacent pair of spherical segments defining a channel therebetween configured to receive an articulation cable therethrough, each channel including an angled surface on opposing sides thereof to allow articulation of each cable along a respective length thereof; and
   a pair of casings configured to operably receive and retain the ball joint on opposing ends thereof, each casing including a chamfer defined therein configured to rotationally receive an end of the ball joint therein, each casing including a corresponding number of apertures defined therein each configured to receive a respective articulation cable therethrough.

9. The articulating section according to claim 8, wherein each angled surface of each channel allows the respective articulation cable to articulate from about zero degrees to about sixty degrees.

10. The articulating section according to claim 8, wherein the ball joint includes a central aperture defined therethrough configured to centrally guide one or more actuation or electrical components therethrough without being affected by articulation of the articulating section.

11. The articulating section according to claim 10, wherein the one or more actuation or electrical components include a drive rod, cutter rod and electrical lead wires.

12. The articulating section according to claim 8, wherein the opposing casings are configured to abut one another when the articulation cables are fully articulated.

13. The articulating section according to claim 8, wherein the ball joint is configured to receive four articulation cables arranged in opposing pairs.

14. The articulating section according to claim 13, wherein the opposing pairs of articulation cables, when taut, resist rotation of the ball joint relative to a shaft of the surgical instrument.

15. An articulating section for a shaft of a surgical instrument, comprising:
   a ball joint including a plurality of opposing spherical segments, each adjacent pair of spherical segments defining a channel therebetween configured to receive an articulation cable therethrough, each channel configured to allow articulation of each cable along a respective length thereof; and
   a pair of casings configured to operably receive and retain the ball joint on opposing ends thereof, each casing configured to rotationally receive an end of the ball joint therein, each casing including a corresponding number of apertures defined therein each configured to receive a respective articulation cable therethrough.

16. The articulating section according to claim 15, wherein the ball joint includes a central aperture defined therethrough configured to centrally guide one or more actuation or electrical components therethrough without being affected by articulation of the articulating section.

17. The articulating section according to claim 16, wherein the one or more actuation or electrical components include a drive rod, cutter rod and electrical lead wires.

18. The articulating section according to claim 15, wherein the opposing casings are configured to abut one another when the articulation cables are fully articulated.

19. The articulating section according to claim 15, wherein the ball joint is configured to receive four articulation cables arranged in opposing pairs.

20. The articulating section according to claim 19, wherein the opposing pairs of articulation cables, when taut, resist rotation of the ball joint relative to a shaft of the surgical instrument.

* * * * *